(12) United States Patent
Leung (10) Patent No.: US 7,542,309 B2
(45) Date of Patent: Jun. 2, 2009

(54) VOLTAGE STABILIZER CIRCUIT OF FORWARD CONVERTER

(75) Inventor: Tim Cheung Leung, Taipei Hsien (TW)

(73) Assignee: Hipro Electronics Co., Ltd., Taipei Hsien (TW)

( * ) Notice: Subject to any disclaimer, the term of this patent is extended or adjusted under 35 U.S.C. 154(b) by 269 days.

(21) Appl. No.: 11/602,796

(22) Filed: Nov. 21, 2006

(65) Prior Publication Data

US 2008/0049454 A1 Feb. 28, 2008

(30) Foreign Application Priority Data

Aug. 28, 2006 (TW) .............................. 95215245 U (51) Int. Cl.
*H02M 3/335* (2006.01)

(52) U.S. Cl. ..................... 363/21.06; 363/127; 323/267

(58) Field of Classification Search .............. 363/21.06, 363/127, 21.04, 21.05, 21.07–21.11, 21.14; 323/267

See application file for complete search history.

(56) References Cited

U.S. PATENT DOCUMENTS

| 4,870,555 | A | * | 9/1989 | White ...................... 363/21.06 |
| 5,619,403 | A | * | 4/1997 | Ishikawa et al. .......... 363/21.06 |

\* cited by examiner

*Primary Examiner*—Akm E Ullah
*Assistant Examiner*—Harry Behm
(74) *Attorney, Agent, or Firm*—Ming Chow; Sinorica, LLC (57) ABSTRACT

A voltage stabilizer circuit of forward converter is disclosed to include a transformer, a first switch, a rectifier, an error amplifier, a control circuit, and a driving circuit. The control circuit outputs a regulation signal that controls turn-on time of the first switch, keeping the output of the load voltage at a stable level.

14 Claims, 5 Drawing Sheets

VOLTAGE STABILIZER CIRCUIT OF FORWARD CONVERTER

BACKGROUND OF THE INVENTION

1. Field of the Invention

The present invention relates generally to a forward converter and more particularly, to a voltage stabilizer circuit of forward converter that uses the power switch as voltage stabilizing and current rectifying member to achieve synchronous rectification of current and increasing of frequency response.

2. Description of the Related Art

Figure 1:
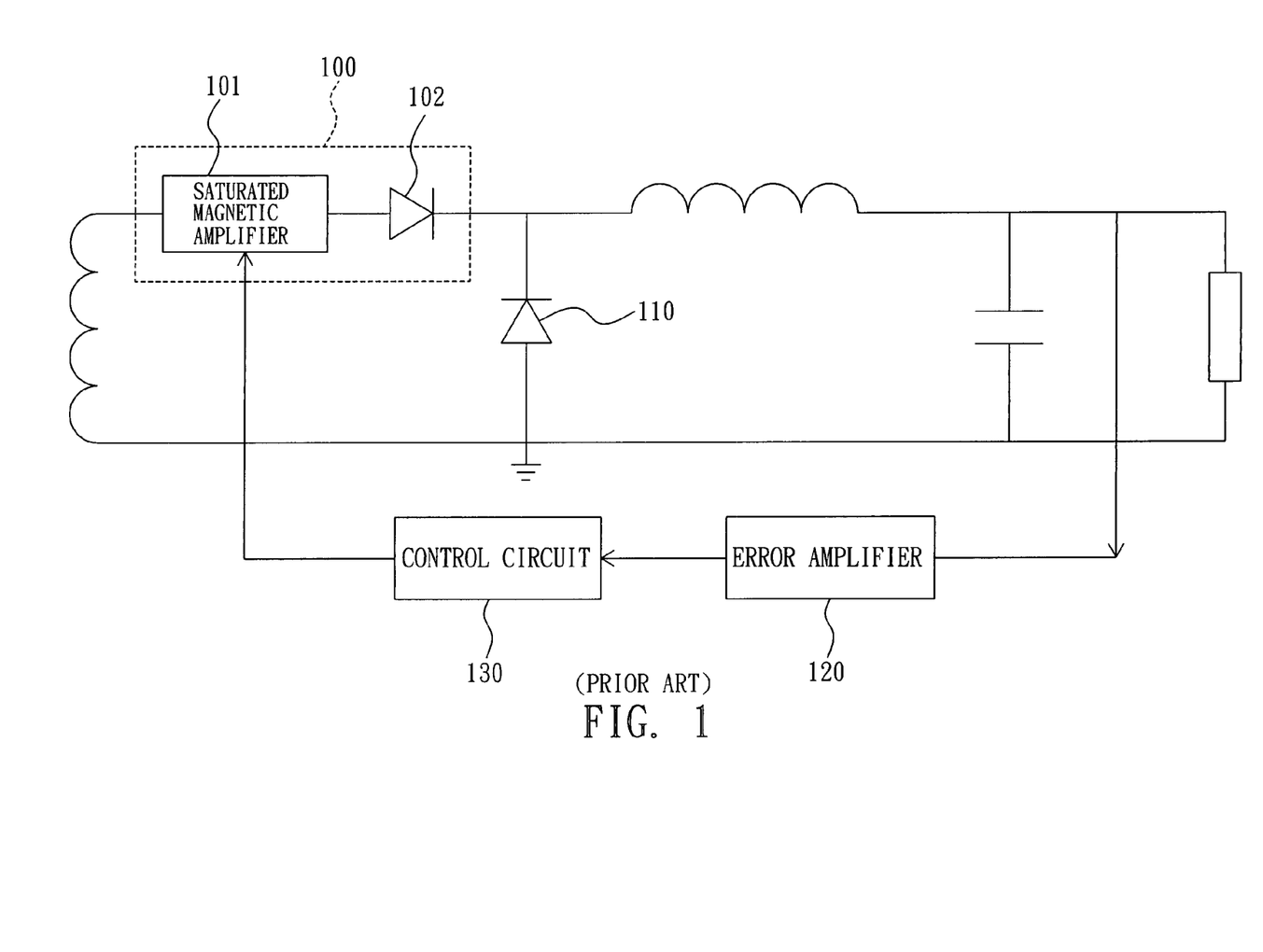
FIG. 1 is a circuit block diagram of a conventional forward converter.

FIG. 1 is a circuit block diagram of a conventional forward converter. According to this design, the forward converter comprises a voltage stabilizer 100, a rectifier 110, an error amplifier 121, and a control circuit 130. The voltage stabilizer 100 comprises a saturated magnetic amplifier 101 and a rectifier 102. This structure of forward converter has numerous drawbacks as follows: (1) It needs to control the magnetized current of the saturated magnetic amplifier 101 so as to regulate the pulse width of the transformer winding. (2) The voltage stabilizer 100 has two elements, namely, the saturated magnetic amplifier 101 and the rectifier 102 that are necessary for controlling its output voltage. (3) For rectifying current synchronously, a metal oxide semiconductor field effect transistor shall be used to substitute for the rectifier 102, and an additional control circuit is needed. (4) The frequency response of the rectifier 110 is relatively low, and for the sake of cost, the frequency response of the rectifier 110 may be designed below 200 KHz.

Therefore, it is desirable to provide a voltage stabilizer circuit of forward converter that eliminates the aforesaid drawbacks.

SUMMARY OF THE INVENTION

The present invention has been accomplished under the circumstances in view. It is one object of the present invention to provide a voltage stabilizer circuit of forward converter, which uses a power switch to work as voltage stabilizing and current rectifying means, achieving synchronous rectification of electric current and increasing frequency response.

It is another object of the present invention to provide a voltage stabilizer circuit of forward converter, which uses one power switch to work as voltage stabilizing and current rectifying means, thereby simplifying the circuit structure.

It is still another object of the present invention to provide a voltage stabilizer circuit of forward converter, which uses one power switch to work as voltage stabilizing and current rectifying means, thereby reducing the manufacturing cost.

To achieve these and other objects of the present invention, the voltage stabilizer circuit of forward converter comprises a transformer, a first switch three terminals element, a rectifier, an error amplifier, a control circuit, and a driving circuit. The transformer has a primary side and a secondary side. The secondary side comprises first winding means and one second winding means. The first winding means is adapted to output a first DC voltage. The second winding means is adapted to output a second DC voltage. The first switch has a first end coupled to one end of the first winding means, a second end, and a third end having connected in series thereto an inductor and a capacitor. The capacitor at the third end of the first switch has a load connected to two opposite ends thereof. The rectifier has a first end coupled to the third end of the first switch, and a second end coupled to an opposite end of the first winding means and then grounded. The error amplifier has a first end coupled to the load to detect voltage variation of the load and to output a corresponding control signal. The control circuit has an input end coupled to the error amplifier and adapted to output a regulation signal subject to the control signal of the error amplifier. The driving circuit has a first end coupled to the control circuit, and a second end coupled to the second end of the first switch for controlling turn-on time of the first switch subject to the regulation signal from the control circuit to maintain the output of the load voltage at a predetermined level.

BRIEF DESCRIPTION OF THE DRAWINGS

FIG. 4($a$) is a typical waveform chart obtained during operation of the voltage stabilizer circuit of forward converter according to the present invention.

FIG. 4($b$) is a schematic waveform chart obtained from the voltage stabilizer circuit of forward converter according to the present invention during variation of the load.

DETAILED DESCRIPTION OF THE INVENTION

Figure 2:
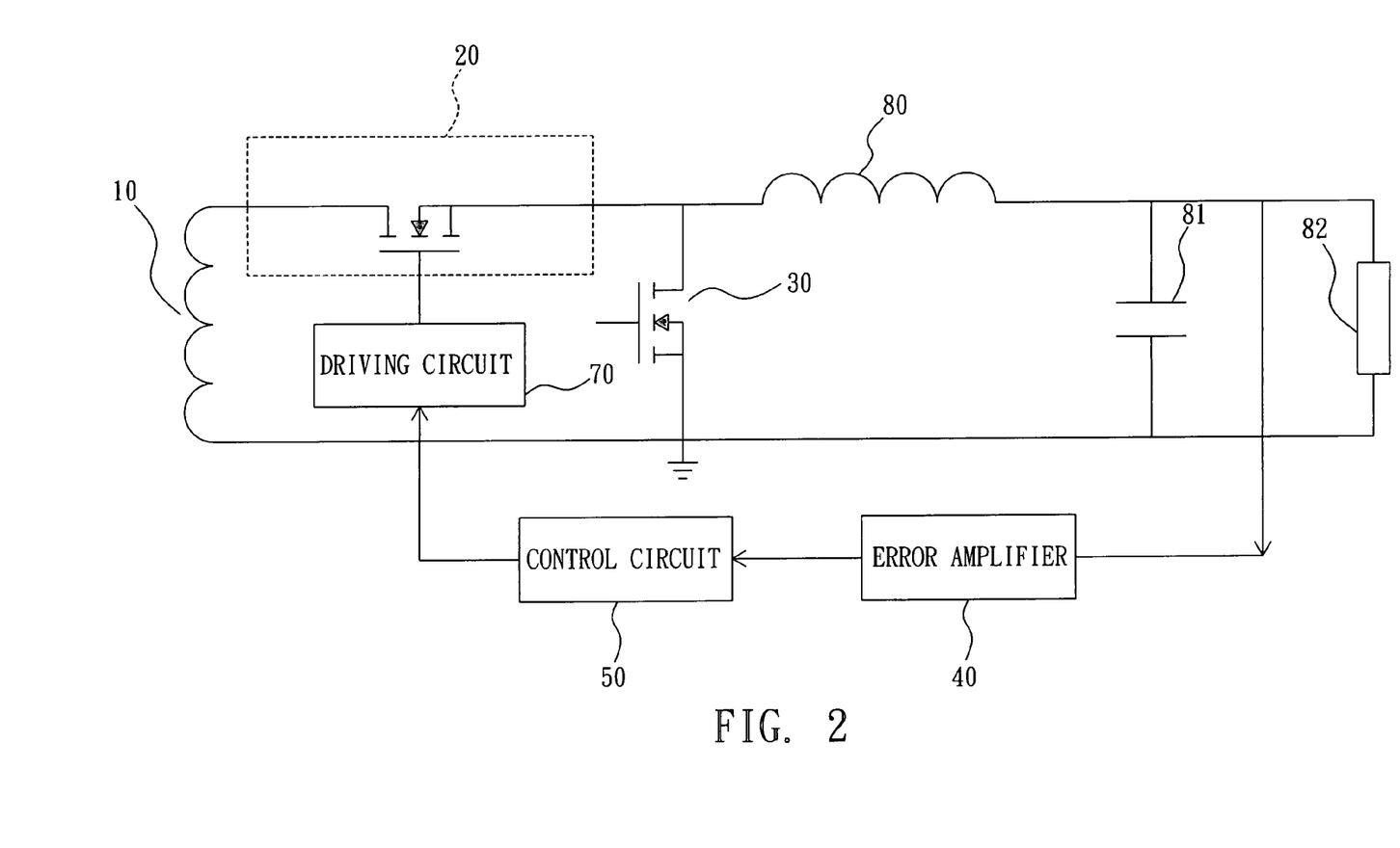
FIG. 2 is a circuit block diagram of a voltage stabilizer circuit of forward converter according to the present invention.

Referring to FIG. 2, a voltage stabilizer circuit of forward converter in accordance with the present invention is shown comprising a transformer 10, a first switch 20, a rectifier 30, an error amplifier 40, a control circuit 50, and a driving circuit 70.

The transformer 10 has a primary side (not shown) and a secondary side 11. The secondary side 11 comprises at least one first winding 111 and one second winding 112. The first winding 111 is adapted to output a first DC voltage, for example, +5V. The second winding 112 is adapted to output a second DC voltage, for example, +12V. Because the transformer 10 is a power adapter of the known art, no further detailed description in this regard is necessary.

The first switch 20 is a three terminals element that can be any of a variety of power switches. For example, the first switch 20 can be a N-channel metal oxide semiconductor field effect transistor, N-channel metal oxide semiconductor field effect transistor, P-channel oxide semiconductor field effect transistor, or P-channel metal oxide semiconductor field effect transistor. Hereinafter, the first switch 20 is called as first metal oxide semiconductor field effect transistor 20, having its first end coupled to one end of the first winding 111 and its third end connected in series to an inductor 80 and then in series to a capacitor 81. The capacitor 81 has its two opposite ends electrically connected to a load 82. The first end of the first metal oxide semiconductor field effect transistor 20 is the drain. The second end of the first metal oxide semiconductor field effect transistor 20 is the gate. The third end of the first metal oxide semiconductor field effect transistor 20 is the source.

The rectifier 30 has one end coupled to the third end of the first metal oxide semiconductor field effect transistor 20, and the other end coupled to the other end of the first winding 111 and then grounded. The rectifier 30 can be a diode or power switch. When considering the manufacturing cost, the rectifier 30 can be formed of a diode to lower the cost. When a power switch is used for the rectifier 30, it works synchronously with the first metal oxide semiconductor field effect transistor 20 to rectify current, improving the efficiency. When a power switch is used for the rectifier 30, it can be a N-channel metal oxide semiconductor field effect transistor, N-channel metal oxide semiconductor field effect transistor, P-channel metal oxide semiconductor field effect transistor, or P-channel metal oxide semiconductor field effect transistor.

The error amplifier 40 has one end coupled to the load 82 to detect variation of the voltage of the load 82 and to output a corresponding control signal to the control circuit 50. With respect to the detail of the error amplifier 40, please refer to FIG. 3.

The control circuit 50 has its input end coupled to the error amplifier 40. Further, the control circuit 50 outputs a regulation signal subject to the control signal received from the error amplifier 40. The control circuit 50 can be, for example, a pulse width modulator (PWM), and the regulation signal is a pulse width regulation signal.

The driving circuit 70 has one end coupled to the control circuit 50, and the other end coupled to the second end of the first metal oxide semiconductor field effect transistor 20. The driving circuit 70 controls the turn-on time of the first metal oxide semiconductor field effect transistor 20 subject to the regulation signal from the control circuit 50, thereby maintaining the output of the load voltage at a stable level.

Figure 3:
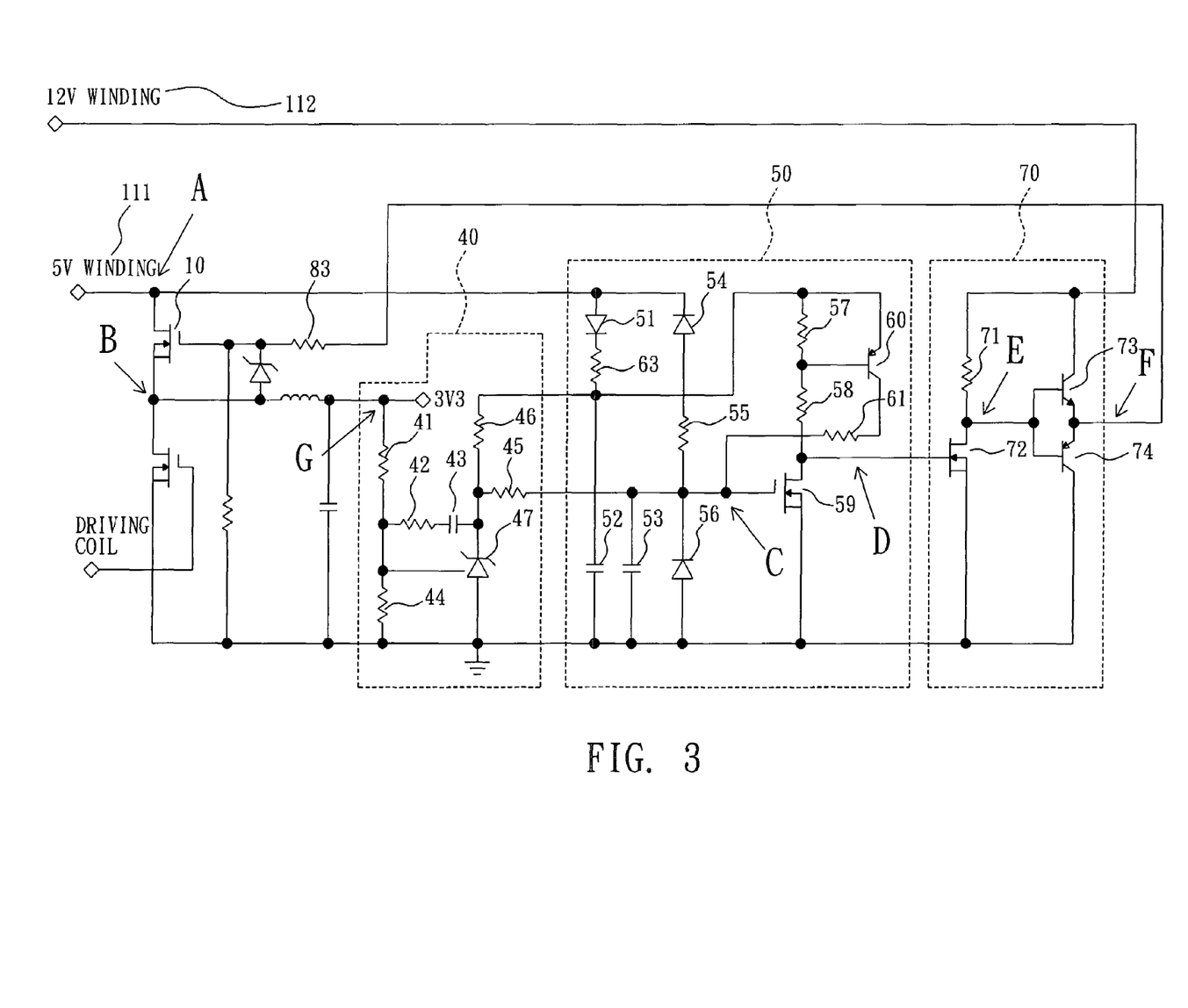
FIG. 3 is a detailed circuit diagram of the voltage stabilizer circuit of forward converter according to the present invention.

FIG. 3 is a detailed circuit diagram of the voltage stabilizer circuit of forward converter according to the present invention. As illustrated, the error amplifier 40 is comprised of a first resistor 41, a second resistor 42, a first capacitor 43, a third resistor 44, a fourth resistor 45, a fifth resistor 46, and a gate-controlled diode 47.

The first resistor 41 has one end coupled to a third DC voltage, for example, +3.3V.

The second resistor 42 has one end coupled to the second end of the first resistor 41.

The first capacitor 43 has one end coupled to the second end of the second resistor 42.

The third resistor 44 has one end coupled to the second end of the first resistor, and the other end grounded.

The fourth resistor 45 has one end coupled to the second end of the first capacitor 43, and the other end coupled to the control circuit 50.

The fifth resistor 46 has one end coupled to the control circuit 50, and the other end coupled to the second end of the first capacitor 43 and the second end of the fourth resistor 45.

The gate-controlled diode 47 has its gate coupled to the first end of the third resistor 44, its anode grounded, and its cathode coupled to the second end of the first capacitor 43.

When the load 82 is changed to lower the output voltage, the output voltage of the gate-controlled diode 47 is increased, allowing a relatively greater amount of electric current to pass to the control circuit 50.

As shown in FIG. 3, the control circuit 50 is comprised of a first diode 51, a second capacitor 52, a third capacitor 53, a second diode 54, a sixth resistor 55, a third diode 56, a seventh resistor 57, an eighth resistor 58, a third switch 59, a fifth switch 60, and a ninth resistor 61.

The first diode 51 has its anode coupled to the first DC voltage, and its cathode coupled to the second end of the fifth resistor 46.

The second capacitor 52 has one end coupled to the cathode of the first diode 51, and the other end grounded.

The third capacitor 53 has one end coupled to the second end of the fourth resistor 45, and the other end grounded.

The second diode 54 has its cathode coupled to the first DC voltage.

The sixth resistor 55 has one end coupled to the anode of the second diode 54.

The third diode 56 has its cathode coupled to the second end of the sixth resistor 55 and the second end of the third capacitor 53, and its anode grounded.

The seventh resistor 57 has one end coupled to the cathode of the first diode 51.

The eighth resistor 58 has one end coupled to the second end of the seventh resistor 57.

The third switch 59 is a three terminals element, having its first end coupled to the second end of the eighth resistor 58, its second end coupled to the second end of the sixth resistor 55 and the cathode of the third diode 56, and its third end grounded. The third switch 59 can be any power switch, for example, a N-channel metal oxide semiconductor field effect transistor, N-channel metal oxide semiconductor field effect transistor, N-channel metal oxide semiconductor field effect transistor, P-channel metal oxide semiconductor field effect transistor, or P-channel junction metal oxide semiconductor field effect transistor. The first end of the third switch 59 is the drain. The second end of the third switch 59 is the gate. The third end of the third switch 59 is the source.

The fifth switch 60 is a three terminals element, for example, a PNP transistor, having its first end coupled to the first end of the seventh resistor 57 and its second end coupled to the second end of the seventh resistor 57 and the first end of the eighth resistor 58. The first end of the fifth switch 60 is the emitter. The second end of the fifth switch 60 is the base. The third end of the fifth switch 60 is the collector.

The ninth resistor 61 has its first end coupled to the second end of the third switch 59, and its second end coupled to the third end of the fifth switch 60.

The electric current that passes to the error amplifier 40 charges the third capacitor 53, causing the voltage at the two ends of the third capacitor 53 to reach the critical voltage ($V_{th}$) at the second end of the third switch 59 within a short period of time.

Further, the a current-limit resistor 63 may be connected in series between the first diode 51 and the second capacitor 52 to limit the current passing through the first diode 51 and the second capacitor 52.

As shown in FIG. 3, the driving circuit 70 is comprised of a tenth resistor 71, a fourth switch 72, a sixth switch 73, and a seventh switch 74.

The tenth resistor 71 has one end coupled to the second DC voltage.

The fourth switch 72 is a three terminals element, having its first end coupled to the second end of the tenth resistor 71, its second end coupled to the first end of the third switch 59, and its third end grounded. The fourth switch 72 can be any power switch, for example, a N-channel metal oxide semiconductor field effect transistor, N-channel metal oxide semiconductor field effect transistor, P-channel metal oxide semiconductor field effect transistor, or P-channel metal oxide semiconductor field effect transistor. The first end of the fourth switch 72 is the drain. The second end of the fourth switch 72 is the gate. The third end of the fourth switch 72 is the source.

The sixth switch 73 is a three terminals element, having its first end coupled to the second end of the first switch 10 through the twelfth resistor 83, its second end coupled to the first end of the fourth switch 72, and its third end coupled to the second DC voltage. The sixth switch 73 can be a transistor, for example, NPN transistor. In this case, the first end of the sixth switch 73 is the emitter; the second end of the sixth switch 73 is the base; the third end of the sixth switch 73 is the collector.

The seventh switch 74, is a three terminals element, having its first end coupled to the first end of the sixth switch 73, its second end coupled to the first end of the fourth switch 72, and its third end grounded. The seventh switch 74 can be a PNP transistor. In this case, the first end of the seventh switch 74 is the emitter; the second end of the seventh switch 74 is the base; the third end of the seventh switch 74 is the collector.

Figure 4A:
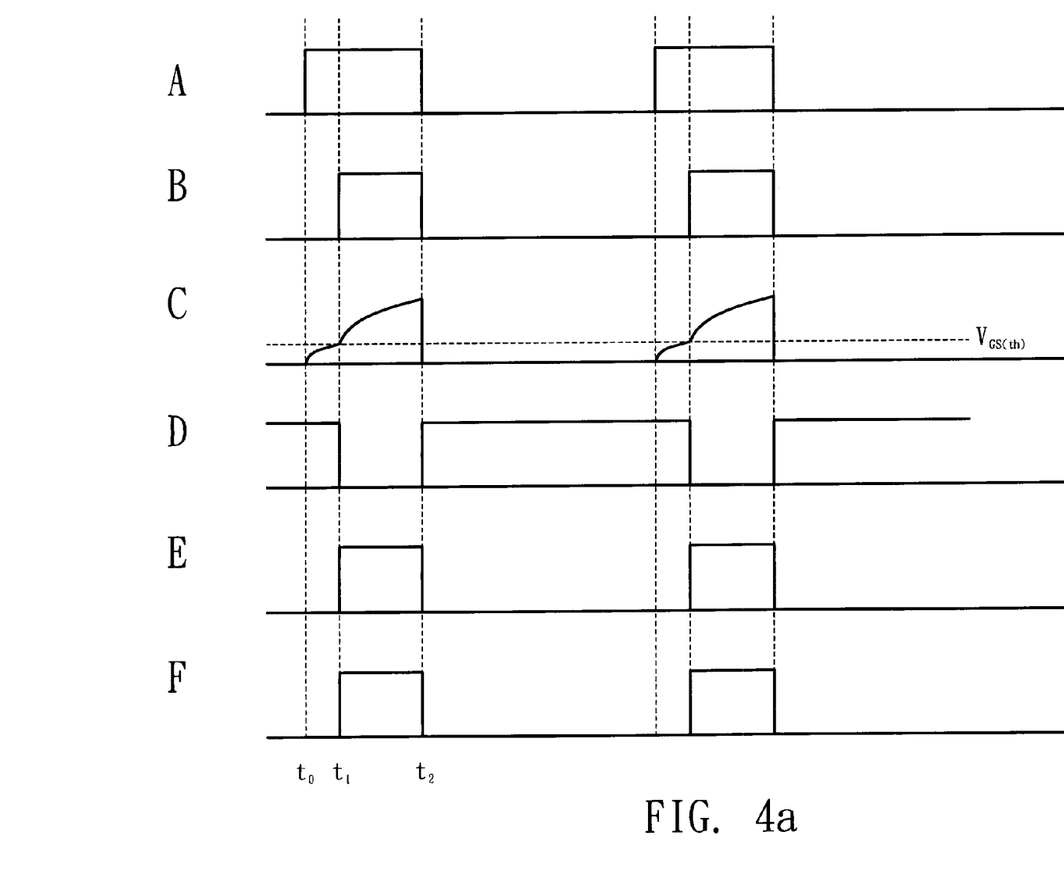
Figure 4B:
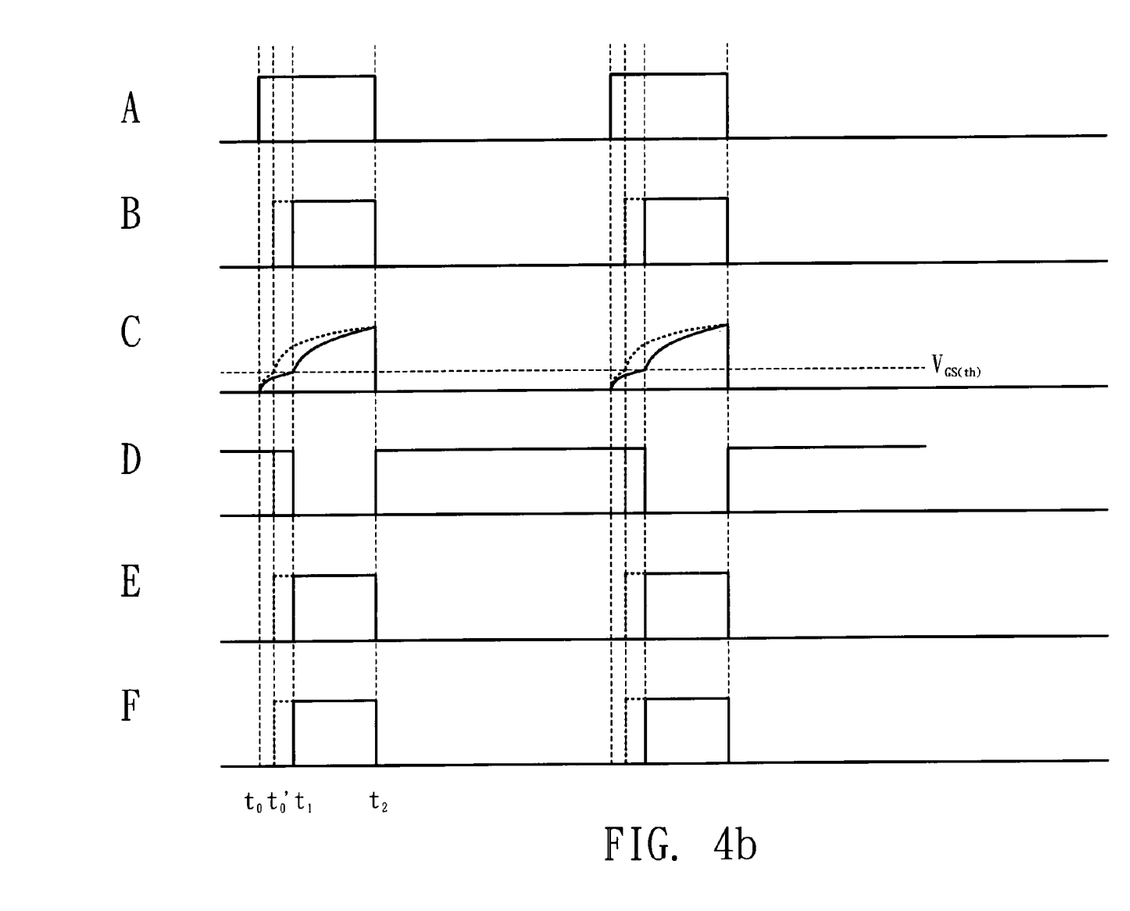

FIG. 4(a) is a typical waveform chart obtained during operation of the voltage stabilizer circuit of forward converter according to the present invention. FIG. 4(b) is a schematic waveform chart obtained from the voltage stabilizer circuit of forward converter according to the present invention during variation of the load. As shown in FIG. 4(a), the waveform shown at point A is the voltage input waveform of the first winding 111 of the transformer 10 of which the peak is detected by the second diode 54, and at this time the second capacitor 52 generates the necessary voltage for the control circuit 51; the output at point G is fed back to the error amplifier 40 through feedback resistors, i.e., the first resistor 41 and the third resistor 44; the error amplifier 40 has its compensation loop formed of the second resistor 42 and the first capacitor 43 to be biased by the fifth resistor 46; at time point $t_0$, the output voltage of the error amplifier 40 passes through the fourth resistor 45 to charge the third capacitor 53; at time point $t_1$, the voltage at the third capacitor 53 surpasses the critical voltage $V_{GS(th)}$ of the gate of the third switch 59, thereby causing the third switch 59 to be turned on; the fifth switch 60 and the ninth resistor 61 form a positive feedback loop such that turning on the third switch 59 causes the fifth switch 60 to be turned on for enabling more electric current to pass to the gate of the third switch 59 to accelerate turn-on action of the third switch 59; at time point $t_1$, the voltage at point D drops to low potential, and the fourth switch 72 is turned off; the fourth switch 72, the sixth switch 73, the seventh switch 74 and the tenth resistor 71 form the driving circuit 70 of the gate of the first switch 20, and at time point $t_1$, the voltage at point E is changed to high potential to turn on the sixth switch 73, such that the voltage at point F is immediately increased to high potential and to further turn on the first switch 20; at time point $t_2$, the voltage at point A drops to low potential and the third capacitor 53 is discharged through the reset path formed of the sixth resistor 55 and the second diode 54, thereby turning off the third switch 59; the voltage at point D is increased to high potential to turn on the fourth switch 72, the voltage at point E is dropped to low potential and the seventh switch 74 is turned on, and the voltage at point F is dropped to low potential to turn off the first switch 20; therefore, the ramp signal at point C cuts off the critical voltage $V_{GS(th)}$ of the gate of the third switch 59, obtaining duty ratio of gate pulse signal at point F.

As shown in FIG. 4(b), when the output voltage drops slightly due to a change of the load 82, the output voltage of the gate-controlled diode 47 rises; at time point $t_1$, more current passes to the third capacitor 53 to charge the third capacitor 53, making the ramp at point C more steep, and therefore the voltage at the third capacitor 53 reaches the critical voltage $V_{GS(th)}$ of the gate of the third switch 59 within a short time, and thus the duty ration of the gate pulse signal at point F is increased, causing increasing of the output voltage to the previous stable value.

Therefore, a power adapter according to the present invention needs only one power switch to work as voltage stabilizing and current rectifying element, achieving the advantages of synchronizing current rectification, increasing frequency response, simplifying circuit structure, and reducing the cost.

Therefore, the voltage stabilizer circuit of forward converter of the invention shows improvements when compared to conventional designs.

A prototype of voltage stabilizer circuit of forward converter has been constructed with the features of FIGS. 1~4. The voltage stabilizer circuit of forward converter functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A voltage stabilizer circuit of forward converter comprising:

a transformer, said transformer having a primary side and a secondary side, said secondary side comprising first winding means and one second winding means, said first winding means being adapted to output a first DC voltage, said second winding means being adapted to output a second DC voltage;

a first switch being a three terminals element, said first switch having a first end coupled to one end of said first winding means, a second end, and a third end having connected in series thereto an inductor and a capacitor, the capacitor at the third end of said first switch having a load connected to two opposite ends thereof;

a rectifier, said rectifier having a first end coupled to the third end of said first switch and a second end coupled to an opposite end of said first winding means and then grounded;

an error amplifier, said error amplifier having a first end coupled to said load to detect voltage variation of said load and to output a corresponding control signal;

a control circuit, said control circuit having an input end coupled to said error amplifier and adapted to output a regulation signal subject to the control signal of said error amplifier;

a driving circuit, said driving circuit having a first end coupled to said control circuit and a second end coupled to the second end of said first switch for controlling turn-on time of said first switch subject to the regulation signal from said control circuit to maintain the output of the load voltage at a predetermined level;

a first resistor, said first resistor having a first end coupled to a third DC voltage and a second end;

a second resistor, said second resistor having a first end coupled to the second end of said first resistor, and a second end;

a first capacitor, said first capacitor having a first end coupled to the second end of said second resistor, and a second end;

a third resistor, said third resistor having a first end coupled to the second end of said first resistor, and a second end grounded;

a fourth resistor, said fourth resistor having a first end coupled to the second end of said first capacitor, and a second end coupled to said control circuit;

a fifth resistor, said fifth resistor having a first end coupled to said control circuit, and a second end coupled to the second end of said first capacitor and the second end of said fourth resistor; and a gate-controlled diode, said gate-controlled diode having a gate coupled to the first end of said third resistor, an anode grounded, and a cathode coupled to the second end of said first capacitor, wherein when said load is changed to lower the output voltage of said load, the output voltage of said gate-controlled diode is increased, allowing a relatively greater amount of electric current to pass to said control circuit.

2. The voltage stabilizer circuit of forward converter as claimed in claim 1, wherein said first DC voltage is +5V, and said second DC voltage is +12V.

3. The voltage stabilizer circuit of forward converter as claimed in claim 1, wherein said first switch is a power switch formed of one of the metal oxide semiconductor field effect transistors of N-channel metal oxide semiconductor field effect transistor, N-channel metal oxide semiconductor field effect transistor, P-channel metal oxide semiconductor field effect transistor, and P-channel metal oxide semiconductor field effect transistor.

4. The voltage stabilizer circuit of forward converter as claimed in claim 3, wherein the first, second and third ends of said first switch are the drain, gate and source of the metal oxide semiconductor field effect transistor used.

5. The voltage stabilizer circuit of forward converter as claimed in claim 1, wherein said rectifier is selected from one of a diode and a power switch formed of one of the metal oxide semiconductor field effect transistors of N-channel metal oxide semiconductor field effect transistor, N-channel metal oxide semiconductor field effect transistor, P-channel metal oxide semiconductor field effect transistor, and P-channel metal oxide semiconductor field effect transistor.

6. The voltage stabilizer circuit of forward converter as claimed in claim 1, wherein said control circuit comprises:
 a first diode, said first diode having an anode coupled to said first DC voltage, and a cathode coupled to the second end of said fifth resistor;
 a second capacitor, said second capacitor having a first end coupled to the cathode of said first diode and a second end grounded;
 a third capacitor, said third capacitor having a first end coupled to the second end of said fourth resistor and a second end grounded;
 a second diode, said second diode having a cathode coupled to said first DC voltage, and an anode;
 said sixth resistor having a first end coupled to the anode of said second diode, and a second end;
 a third diode, said third diode having a cathode coupled to the second end of said sixth resistor and the second end of said third capacitor, and an anode grounded;
 a seventh resistor, said seventh resistor having a first end coupled to the cathode of said first diode, and a second end;
 an eighth resistor, said eighth resistor having a first end coupled to the second end of said seventh resistor, and a second end;
 a third switch being a three terminals element, said third switch having a first end coupled to the second end of said eighth resistor, a second end coupled to the second end of said sixth resistor and the cathode of said third diode, and a third end grounded;
 a fifth switch being a three terminals element, said fifth switch having a first end coupled to the first end of said seventh resistor, a second end coupled to the second end of said seventh resistor, and the first end of said eighth resistor, and a third end; and
 a ninth resistor, said ninth resistor having a first end coupled to the second end of said third switch and a second end coupled to the third end of said fifth switch;
wherein said error amplifier allows input current to charge said third capacitor, causing the voltage at the two ends of said third capacitor to reach the critical voltage at the second end of said third switch within a predetermined length of time.

7. The voltage stabilizer circuit of forward converter as claimed in claim 6, wherein said third switch is a power switch formed of one of the metal oxide semiconductor field effect transistors of N-channel metal oxide semiconductor field effect transistor, N-channel metal oxide semiconductor field effect transistor, P-channel metal oxide semiconductor field effect transistor, and P-channel metal oxide semiconductor field effect transistor; wherein the first, second and third end of said third switch are respectively the drain, gate and source of the metal oxide semiconductor field effect transistor used.

8. The voltage stabilizer circuit of forward converter as claimed in claim 6, wherein said fifth switch is a PNP transistor, and the first, second and third ends of said fifth switch are respectively the emitter, base and collector of the PNP transistor.

9. The voltage stabilizer circuit of forward converter as claimed in claim 6, wherein said first diode and said second capacitor have a current-limit resistor connected in series thereto to limit electric current passing through said first diode and said second capacitor.

10. The voltage stabilizer circuit of forward converter as claimed in claim 6, wherein said driving circuit comprises:
 a tenth resistor, said tenth resistor having a first end coupled to said second DC voltage, and a second end;
 a fourth switch being a three terminals element, said fourth switch having a first end coupled to the second end of said tenth resistor, a second end coupled to the first end of said third switch, and a third end grounded;
 a sixth switch being a three terminals element, said sixth switch having a first end coupled to the second end of said first switch through a twelfth resistor, a second end coupled to the first end of said fourth switch, and a third end coupled to said second DC voltage;
 a seventh switch being a three terminals element, said seventh switch having a first end coupled to the first end of said sixth switch, a second end coupled to the first end of said fourth switch, and a third end grounded; and
 a fourth switch being a three terminals element, said fourth switch having a first end coupled to the first end of said sixth switch, a second end coupled to the first end of said fourth switch;
wherein the critical voltage of said third switch is adapted to regulate the width of duty ratio of the output pulse of said sixth switch and seventh switch.

11. The voltage stabilizer circuit of forward converter as claimed in claim 10, wherein said fourth switch is a power switch formed of one of the metal oxide semiconductor field effect transistors of N-channel metal oxide semiconductor field effect transistor, N-channel metal oxide semiconductor field effect transistor, P-channel metal oxide semiconductor field effect transistor, and P-channel metal oxide semiconductor field effect transistor; wherein the first, second and third end of said third switch are respectively the drain, gate and source of the metal oxide semiconductor field effect transistor used.

12. The voltage stabilizer circuit of forward converter as claimed in claim 10, wherein said sixth switch is a NPN transistor; said seventh switch is a PNP transistor; the first, second and third ends of said sixth switch and said seventh switch are respectively the emitter, base and collector of the respective transistor.

13. The voltage stabilizer circuit of forward converter as claimed in claim 1, wherein said control circuit is a pulse width modulator, and said regulation signal is a pulse width regulation signal.

14. The voltage stabilizer circuit of forward converter as claimed in claim 1, wherein said third DC voltage is +3.3V.

* * * * *